(12) United States Patent
Ku

(10) Patent No.: US 8,290,336 B2
(45) Date of Patent: Oct. 16, 2012

(54) KEYBOARD HAVING VIDEO AND AUDIO RECORDING FUNCTION

(76) Inventor: Allen Ku, Walnut, CA (US)

( * ) Notice: Subject to any disclaimer, the term of this patent is extended or adjusted under 35 U.S.C. 154(b) by 234 days.

(21) Appl. No.: 12/861,839

(22) Filed: Aug. 24, 2010

(65) Prior Publication Data

US 2012/0051716 A1 Mar. 1, 2012

(51) Int. Cl.
*H04N 5/765* (2006.01)

(52) U.S. Cl. ........................................ 386/231; 386/234

(58) Field of Classification Search .................. 386/231, 386/234, 200, 224, 210
See application file for complete search history.

(56) References Cited

U.S. PATENT DOCUMENTS

| 2007/0247430 A1* | 10/2007 | Huang | 345/168 |
| 2011/0015985 A1* | 1/2011 | Curtis | 705/14.37 |
| 2011/0123169 A1* | 5/2011 | Liu | 386/241 |

* cited by examiner

*Primary Examiner* — Robert Chevalier
(74) *Attorney, Agent, or Firm* — Li & Cai Intellectual Property (USA) Office

(57) ABSTRACT

A keyboard for recording a video and an audio is disclosed. The keyboard having a video and an audio recording function includes a universal serial bus hub coupling with a computer system, a keyboard controller, coupled with the universal serial bus hub, for controlling a keypad matrix, and a video and audio processing module coupling with the universal serial bus hub. The video and audio processing module comprises an analog to digital converter for receiving an analog video signal and an analog audio signal and converting the analog video signal and the analog audio signal to a digital video signal and a digital audio signal, and an encoding controller for encoding the digital video signal and the digital audio signal into a formatted file according to a recording signal from the computer system and transmitting the formatted file to the computer system via the universal serial bus hub.

10 Claims, 2 Drawing Sheets

KEYBOARD HAVING VIDEO AND AUDIO RECORDING FUNCTION

BACKGROUND OF THE INVENTION

1. Field of the Invention

The present invention relates to a keyboard, and more particularly to a keyboard that is capable of recording a video and an audio.

2. Description of Related Art

Computers have now become an essential part of our daily lives as the technology rapidly advances. A keyboard is one of standard peripheral devices of the computer and has been widely used as an input device. At the same time, as a universal serial bus (USB) interface has been gaining the popularity due to its plug-and-play characteristic, the USB interface become one of the favorite choices for facilitating a communication between the keyboard and the computer.

Typically, each computer may communicate with multiple peripheral devices including a keyboard, a mouse, a monitor, and a speaker. However, additional USB interfaces (e.g., USB ports) have to be placed at the computer in order to accommodate the connection of every peripheral device to the computer via the USB interface, increasing the manufacturing cost of the computer. On the other hand, not every peripheral device could be in connection with the computer via the USB ports when the computer is only with a limited number of the USB ports.

Recently, the keyboard is integrated with video conference function. However, for facilitating the video conference several equipments such as web cameras, microphones, and amplifiers may have to be in connection with the computer through the USB ports at the expense of the USB connection between other peripheral devices and the computer.

SUMMARY OF THE INVENTION

One objective of the present invention is to extend the universal serial bus port of computer by means of circuit design. Therefore, the keyboard with function of hub is capable of video and audio recording by receiving an analog video and an audio signal and encoding them.

The keyboard having a video and audio recording function includes a universal serial bus hub, a keyboard controller for controlling a keypad matrix, and a video and audio processing module comprising an analog to digital converter for receiving an analog video signal and an analog audio signal and converting the analog video signal and the analog audio signal into a digital video signal and a digital audio signal, and an encoding controller for encoding the digital video signal and the digital audio signal into a formatted file according to a recording signal from the computer system and transmitting the formatted file to the computer system via the universal serial bus hub.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

Figure 1:
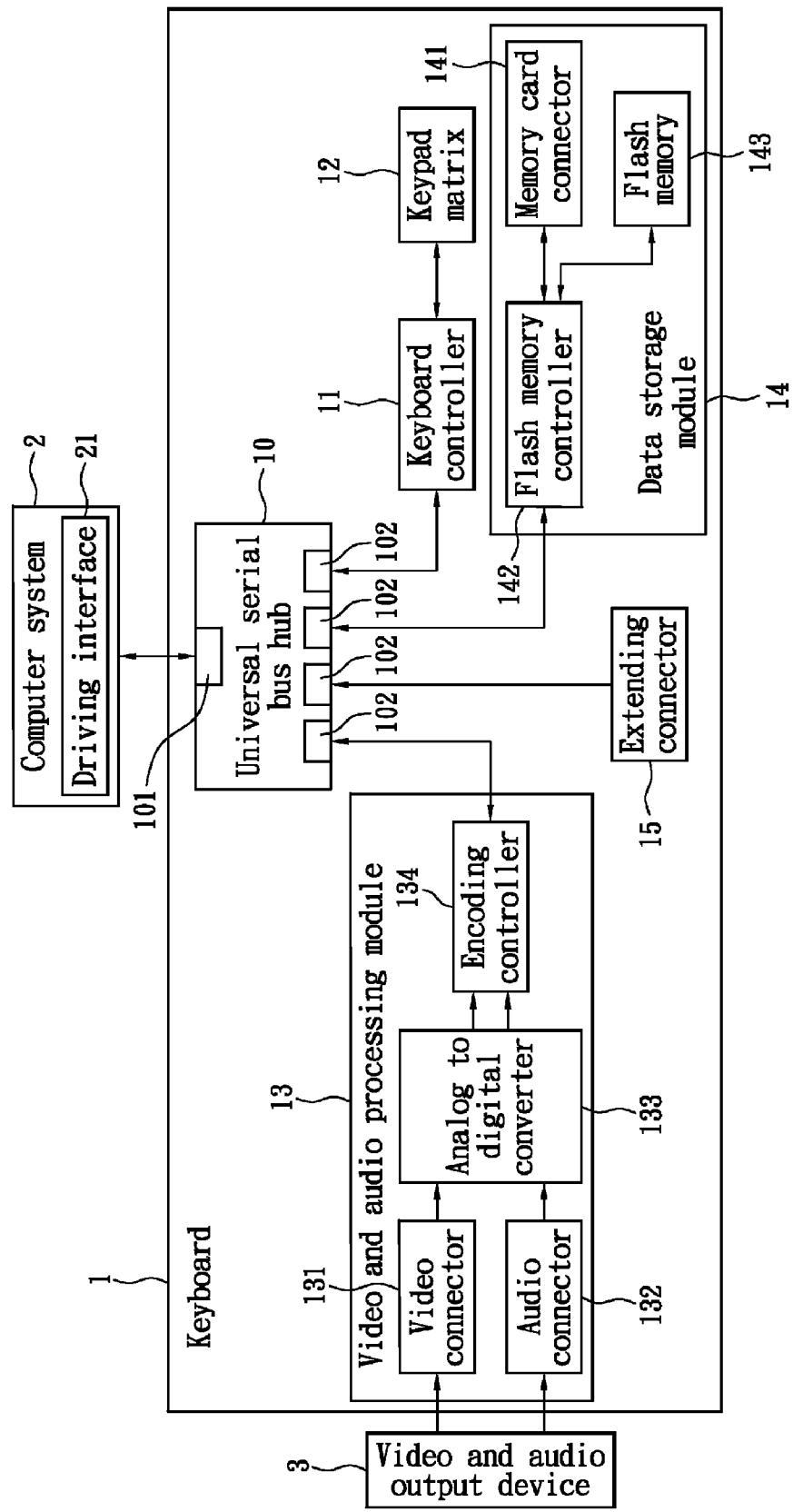
FIG. 1 is a is a functional block diagram of a keyboard having video and audio recording function in accordance with one embodiment of the present invention.

FIG. 1 is a is a functional block diagram of a keyboard having video and audio recording function in accordance with one embodiment of the present invention.

Throughout the disclosure, the keyboard 1 connects with a computer system 2 via a universal serial bus interface and includes a universal serial bus hub 10, a keyboard controller 11, a keypad matrix 12, a video and audio processing module 13, a data storage module 14, and an extending connector 15.

The universal serial bus hub 10 is configured to be a transmission channel between the keyboard 1 and the computer system 2. The universal serial bus hub 10 includes an up-stream port 101 and a plurality of down-stream ports 102. The up-stream port 101 is electrically connected with the computer system 2 and the pluralities of the down-link ports 102 are electrically connected with the keyboard controller 11, the video and audio processing module 13, the data storage module 14, and the extending connector 15, respectively. In other word, the keyboard controller 11, the video and audio processing module 13, the data storage module 14, and the extending connector 15 operate in parallel and transmit data to the computer system 2 via the universal serial bus 10. It is worth noting that the number of the down-stream ports 102 is adjustable and not limited by the illustration in FIG. 1.

In addition, the universal serial bus hub 10 is designed in a single chip bonding on a circuit board of the keyboard 1. Therefore, the down-stream ports 102 are electrically connected with the keyboard controller 11, the video and audio processing module 13, the data storage module 14, and the extending connector 15 via conductive traces of the circuit board.

The keyboard controller 11 is configured to control operations of the keypad matrix 12 according to received inputs from keys of the keyboard 1 corresponding to the keypad matrix 12.

The video and audio processing module 13 includes a video connector 131 for receiving an analog video signal from a video and audio output device 3, an audio connector 132 for receiving an analog audio signal, an analog to digital converter 133 for receiving the analog video signal and the analog audio signal and converting the analog video signal into a digital video signal and the analog audio signal into a digital audio signal, and an encoding controller 134 for encoding the digital video signal and the digital audio signal into a formatted file such as moving picture experts group (MPEG)-2, MPEG-4, H.263, or H.264 format according to a recording signal from the computer system 2 and transmitting the formatted file to the computer system 2.

In one embodiment, the video connector 131 and the audio connector 132 are integrated in one complex port or one complex connector. The analog to digital converter 133 and the encoding controller 134 are integrated in a single chip for saving cost and space and minimizing the occurrence of potential problems arising out of the layout associated with the standing alone analog to digital converter 133 and the encoding controller 134.

Based on the structure of the universal serial bus hub 10, the computer system 2 may serve as a host while the video and audio processing module 13 acts as a peripheral device related to the host. Therefore, the video and audio processing module 13 may operate under the control of the computer system 2. Before the computer system 2 could control the video and audio processing module 13, the computer system 2 may need to recognize the video and audio processing module 13. The computer system 2 includes a driving interface 21 interfacing with human operators. When any video and audio output device 3 is in connection with the keyboard 1 for receiving an input of the analog audio and video signal, the human operations may manipulate the computer system 2 through the interface 21 to cause the video and audio processing module 13 to operate. The driving interface 21 also allows the human operators to set a storage path setting value, which may indicate an actual physical storage location of the formatted file at a corresponding system disk. Therefore, when the computer system 2 receives the formatted file from the video and audio processing module 13, the computer system stores the formatted file in according to the storage path setting value.

The data storage module 14 is configured to function as mass storage device for keyboard 1. The data storage module 14 includes a memory card connector 141 for connecting with a memory card, and a flash memory controller 142 connected with the universal serial bus hub 10 and the memory card connector 141 for communicating with the computer system 2 and accessing the data of the memory card. Therefore, the keyboard 1 may also perform as a card reader.

Further, the flash memory controller 142 is enabled by a card detection signal from the memory card connector 141. In other words, the flash memory controller 142 may receive a power supply until after the memory card connector 141 is connected with the memory card, which may generate the card detection signal as the result of grounding circuit design. Therefore, the flash memory controller 142 may not operate before the memory card is in connection with the memory card connector 141, saving the power consumption associated with the powered flash memory controller 142.

Moreover, the data storage module 14 includes a flash memory 143 connected with the flash memory controller 142 for providing additional storage space.

Accordingly, when the data storage module 14 operates, the memory card and the flash memory 143 become the system disk for storing the formatted file from the video and audio module 13.

The extending connector 15 is configured to connect with an external device such as an external universal serial bus device. Thus, once after the keyboard 1 has been in connection with the computer system 2 through one USB port thereof the peripheral devices such as the video and audio output device 3 may be in connection with the computer system 2 through the extending connector 15 instead of the USB ports of the computer system 2. As such, the computer system 2 may accommodate more USB connections even with the limited number of USB ports. In addition, when the universal serial bus hub 10 includes more down-stream ports 102 the keyboard 1 may be supportive of more extending connectors.

Figure 2:
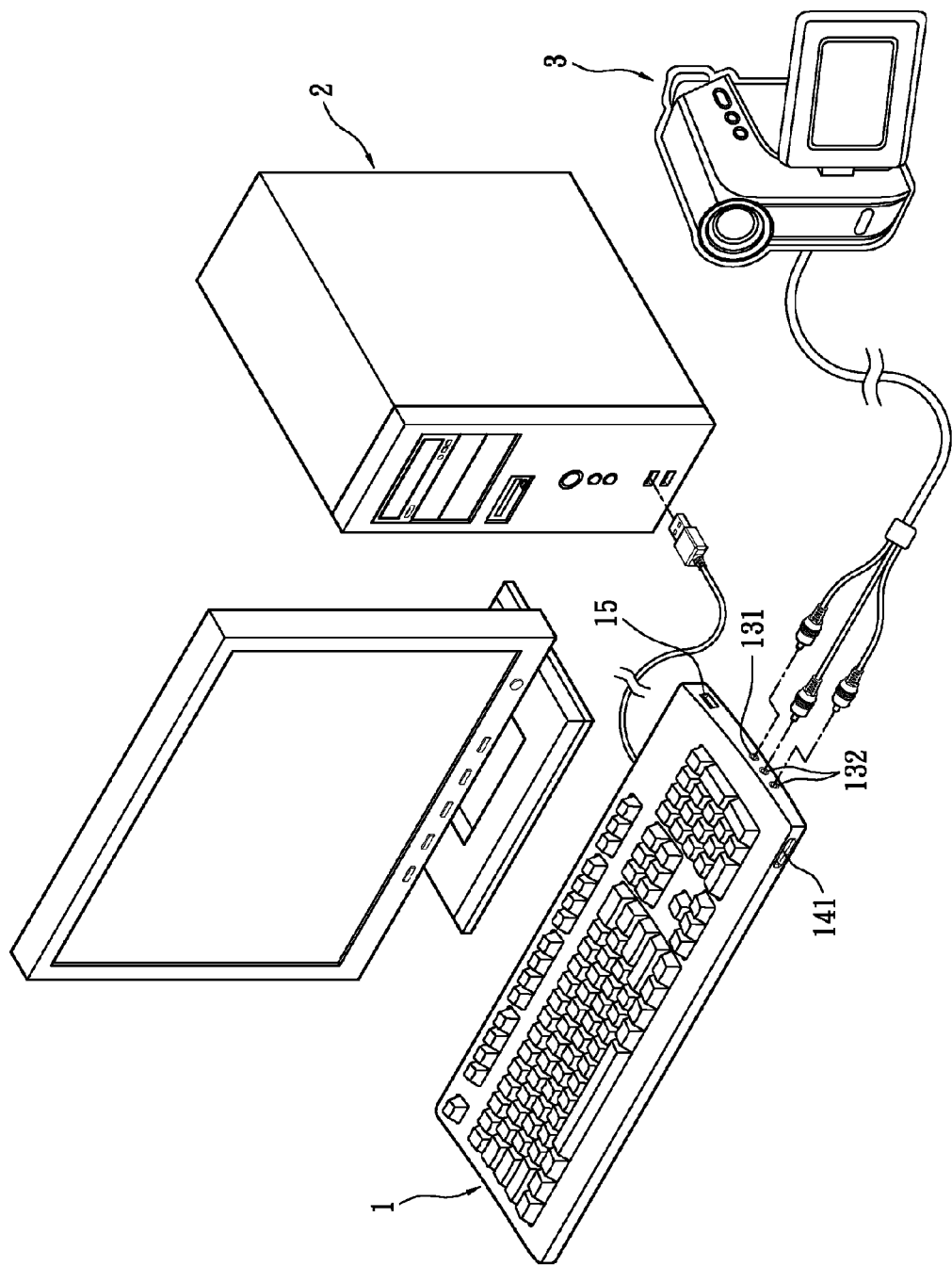
FIG. 2 is a schematic diagram of the keyboard having video and audio recording function in accordance with one embodiment of the present invention.

FIG. 2 is a schematic diagram of the keyboard having video and audio recording function in accordance with one embodiment of the present invention In one implement, the video connector 131, the audio connector 132 and extending connector 15 are placed on the right surface of the casing of the keyboard 1 and the memory card connector 141 is set on the front surface of the casing of the keyboard 1.

Therefore, when the keyboard 1 is connected with the computer system 2 the video and audio output device 3 is connected with the video connector 131 and the audio connector 132. And the video and audio processing module 13 could process the analog video signal and the analog audio signal from the video and audio output device 3 into the formatted file and store the formatted file in the system disk of the computer system 2. The video and audio output device 3 could be a video camera or a video and audio player.

Further, the keyboard 1 having the memory card connector 141 could perform as a card reader for connecting with the memory card and accessing the data in the memory card. Thus, the computer system 2, if connected with the keyboard 1, may access the data stored in the memory card.

To sum up, the present invention keyboard utilizes the universal serial bus hub to enable the performance of the video and audio recording and the general operations of the keyboard controller at the same time. Moreover, the keyboard according to the present invention further includes the data storage module for also serving as the card reader, expanding the functionality of the keyboard itself What are disclosed above are only the specification and the drawings of the preferred embodiment of the present invention and it is therefore not intended that the present invention be limited to the particular embodiment disclosed. It will be understood by those skilled in the art that various equivalent changes may be made depending on the specification and the drawings of the present invention without departing from the scope of the present invention.

What is claimed is:

1. A keyboard having a video and an audio recording function comprising:
   a universal serial bus hub coupling with a computer system;
   a keyboard controller, coupled with the universal serial bus hub, for controlling a keypad matrix; and
   a video and audio processing module coupling with the universal serial bus hub wherein the video and audio processing module comprises:
      an analog to digital converter for receiving an analog video signal and an analog audio signal and converting the analog video signal and the analog audio signal to a digital video signal and a digital audio signal; and
      an encoding controller for encoding the digital video signal and the digital audio signal into a formatted file according to a recording signal from the computer system and transmitting the formatted file to the computer system via the universal serial bus hub.

2. The keyboard as claimed in claim 1, wherein the video and audio processing module further comprises a video connector and an audio connector coupled with a video and audio output device for receiving the analog video signal and the analog audio signal from the video and audio output device.

3. The keyboard as claimed in claim 1, further comprising a data storage module including:
   at least one memory card connector for connecting a memory card; and
   a flash memory controller, coupled with the universal serial bus hub and the memory card connector, for accessing a data of the memory card.

4. The keyboard as claimed in claim 3, wherein the flash memory controller is enabled according to a card detection signal from the memory card connector.

5. The keyboard as claimed in claim 3, wherein the data storage module further comprises a flash memory coupling with the flash memory controller.

6. The keyboard as claimed in claim 3, wherein the computer system comprises a driving interface configured to generate the recording signal and a storage path setting value.

7. The keyboard as claimed in claim 6; wherein the computer system is configured to store the formatted file in a system disk according to the storage path setting value.

8. The keyboard as claimed in claim 3, further comprising an extending connector coupling with universal serial bus hub wherein the extending connector is configured to connect with an external device.

9. The keyboard as claimed in claim 8, wherein the universal serial bus hub further comprises:
   an up-stream port coupling with the computer system; and
   a plurality of down-stream ports coupling with the keyboard controller, the video and audio processing module, the flash memory controller and the extending connector, respectively.

10. The keyboard as claimed in claim 9, wherein the down-stream ports couple with the keyboard controller, the video and audio processing module, the flash memory controller and the extending connector via conductive traces of a circuit board.

* * * * *